US012675011B2

(12) United States Patent
Ye et al.

(10) Patent No.: US 12,675,011 B2
(45) Date of Patent: Jul. 7, 2026

(54) ANTI-PEEPING FILM AND DISPLAY DEVICE

(71) Applicant: WUHAN CHINA STAR OPTOELECTRONICS TECHNOLOGY CO., LTD., Wuhan (CN)

(72) Inventors: Wenlong Ye, Wuhan (CN); Wei Cheng, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 1021 days.

(21) Appl. No.: 17/794,398

(22) PCT Filed: Jul. 1, 2022

(86) PCT No.: PCT/CN2022/103428
§ 371 (c)(1),
(2) Date: Dec. 21, 2023

(87) PCT Pub. No.: WO2023/240712
PCT Pub. Date: Dec. 21, 2023

(65) Prior Publication Data
US 2024/0192532 A1 Jun. 13, 2024

(30) Foreign Application Priority Data

Jun. 17, 2022 (CN) .......................... 202210693038.6

(51) Int. Cl.
*G02F 1/13* (2006.01)
*G02F 1/1335* (2006.01)
(Continued)

(52) U.S. Cl.
CPC .......... *G02F 1/1323* (2013.01); *G02F 1/1335* (2013.01); *G02F 1/133531* (2021.01); *G02F 1/134309* (2013.01); *G02F 1/1347* (2013.01)

(58) Field of Classification Search
CPC . G02F 1/1323; G02F 1/133531; G02F 1/1335
See application file for complete search history.

(56) References Cited

U.S. PATENT DOCUMENTS

2020/0096803 A1* 3/2020 Saitoh ............... G02F 1/133528

FOREIGN PATENT DOCUMENTS

CN 113552741 A 10/2021
CN 113625373 A 11/2021
(Continued)

OTHER PUBLICATIONS

Chinese Office Action issued in corresponding Chinese Patent Application No. 202210693038.6 dated Apr. 19, 2025, pp. 1-6, 14pp.

(Continued)

*Primary Examiner* — Mariceli Santiago
(74) *Attorney, Agent, or Firm* — The Roy Gross Law Firm, LLC; Roy D. Gross

(57) ABSTRACT

Disclosed are an anti-peeping film and a display device. In the present disclosure, an angle between long axes of liquid crystal molecules in a liquid crystal light-adjusting layer and planes in which polarizers are located is set to be an acute angle in a first mode, so that there is an angle between effective long axes of the liquid crystal molecules in the liquid crystal light-adjusting layer and a direction of polarized light in a side-view direction. Therefore, light in the side-view direction of the anti-peeping film is darker. Thus, an anti-peeping effect can be realized, while sharing can be realized in a non-first mode.

20 Claims, 4 Drawing Sheets

(51) Int. Cl.
     G02F 1/1343          (2006.01)
     G02F 1/1347          (2006.01)

(56)                    References Cited

FOREIGN PATENT DOCUMENTS

CN          114019705  A      2/2022
CN          114153086  A  *   3/2022   ........... G02F 1/1323
CN          114167632  A      3/2022
CN          114200704  A      3/2022
CN          114253011  A      3/2022
CN          216622901  U      5/2022
CN          217879881  U     11/2022
CN          115728983  A  *   3/2023
KR        20070058256  A      6/2007
KR        20180099138  A      9/2018

OTHER PUBLICATIONS

PCT International Search Report for International Application No.
PCT/CN2022/103428, mailed on Dec. 23, 2022, 10pp.
PCT Written Opinion of the International Search Authority of
International Application No. PCT/CN2022/103428, mailed on Dec.
23, 2022, 10pp.

* cited by examiner

100

100

100

ANTI-PEEPING FILM AND DISPLAY DEVICE

This application is a National Phase of PCT Patent Application No. PCT/CN2022/103428 having International filing date of Jul. 1, 2022, which claims the benefit of priority of Chinese Patent Application No. 202210693038.6, filed Jun. 17, 2022, the contents of which are all incorporated herein by reference in their entirety.

TECHNICAL FIELD

The present disclosure relates to the field of display technology, and in particular, to an anti-peeping film and a display device.

BACKGROUND

With the popularity and application of display devices, such as smartphones, notebook computers, tablets, and the like, users have become concerned about whether other individuals can read sensitive or private information. In a public place, users pay more and more attention to the privacy of personal information, and the concept of anti-peeping display devices has gradually attracted users' attention. In a common anti-peeping device, an anti-peeping film is attached to the outer surface of the display device, so that a display screen of the display device will become blackened when viewed in the left or right direction, and thus the display screen becomes invisible. However, such anti-peeping method is not switchable, and utilization efficiency of light is reduced due to non-light-transmitting structures of the anti-peeping film.

Technical Problem

The present disclosure provides an anti-peeping film and a display device, in order to switch between an anti-peeping mode and a sharing mode.

Technical Solutions

The present disclosure provides an anti-peeping film comprising:
at least two polarizers;
a liquid crystal light-adjusting layer disposed between two adjacent polarizers;
wherein optical axis directions of the at least two polarizers are parallel to each other, and in a first mode, an angle between long axes of liquid crystal molecules in the liquid crystal light-adjusting layer and planes in which the polarizers are located is an acute angle.

Optionally, in some embodiments of the present disclosure, in the first mode, the angle between the long axes of the liquid crystal molecules in the liquid crystal light-adjusting layer and the planes in which the polarizers are located is greater than or equal to 50 degrees and less than or equal to 70 degrees.

Optionally, in some embodiments of the present disclosure, the planes in which the polarizers are located are a x-y plane composed of an x-axis and a y-axis, and a normal line direction of the polarizers is a z-axis direction perpendicular to the x-y plane; in the first mode, the long axes of the liquid crystal molecules in the liquid crystal light-adjusting layer are located in a y-z plane, and an angle between the long axes of the liquid crystal molecules and the y-axis is $\beta$; and light rays in a side-viewing direction of the anti-peeping film are located in a x-z plane, and an angle between the light rays in the side-viewing direction and the z-axis is $\theta$, wherein $\beta = \arctan((1+\tan\theta)/(2^{1/2}\tan\theta))$, and a value of $\beta$ is greater than or equal to 50 degrees and less than or equal to 70 degrees.

Optionally, in some embodiments of the present disclosure, in the first mode, the angle between the long axes of the liquid crystal molecules in the liquid crystal light-adjusting layer and the planes in which the polarizers are located is 62.63 degrees.

Optionally, in some embodiments of the present disclosure, the number of the polarizers is at least three, and the anti-peeping film comprises at least two liquid crystal light-adjusting layers; and in the first mode, orthographic projections, on the polarizers, of the long axes of the liquid crystal molecules in the at least two liquid crystal light-adjusting layers are parallel to each other.

Optionally, in some embodiments of the present disclosure, the liquid crystal light-adjusting layers at least comprise a first liquid crystal light-adjusting layer and a second liquid crystal light-adjusting layer, and in the first mode, there is an angle between orthographic projections of long axes of liquid crystal molecules in the first liquid crystal light-adjusting layer on the polarizers and orthographic projections of long axes of liquid crystal molecules in the second liquid crystal light-adjusting layer on the polarizers.

Optionally, in some embodiments of the present disclosure, in the first mode, the orthographic projections of the long axes of the liquid crystal molecules in the first liquid crystal light-adjusting layer on the polarizers is perpendicular to the orthographic projections of the long axes of the liquid crystal molecules in the second liquid crystal light-adjusting layer on the polarizers.

Optionally, in some embodiments of the present disclosure, the liquid crystal light-adjusting layer further comprises:
a third liquid crystal light-adjusting layer, wherein in the first mode, the orthographic projections of the long axes of the liquid crystal molecules in the first liquid crystal light-adjusting layer on the polarizers is parallel to orthographic projections of long axes of liquid crystal molecules in the third liquid crystal light-adjusting layer on the polarizers.

Optionally, in some embodiments of the present disclosure, the liquid crystal light-adjusting layer further comprises:
a fourth liquid crystal light-adjusting layer, wherein in the first mode, the orthographic projections of the long axes of the liquid crystal molecules in the second liquid crystal light-adjusting layer on the polarizers is parallel to orthographic projections of long axes of liquid crystal molecules in the fourth liquid crystal light-adjusting layer on the polarizers.

Optionally, in some embodiments of the present disclosure, a thickness of the liquid crystal light-adjusting layer is in a range of 2 microns to 7 microns.

Optionally, in some embodiments of the present disclosure, in a second mode, an angle between the long axes of the liquid crystal molecules in the liquid crystal light-adjusting layer and a normal line of the polarizers is $\varphi$, wherein $\varphi$ is greater than or equal to 87 degrees and less than or equal to 90 degrees, or $\varphi$ is greater than or equal to 0 degrees and less than or equal to 5 degrees.

Optionally, in some embodiments of the present disclosure, the anti-peeping film further comprises:
a first electrode;
a second electrode disposed opposite to the first electrode;

wherein the liquid crystal light-adjusting layer is disposed between the first electrode and the second electrode, and the polarizers are disposed on sides of the first electrode and the second electrode far away from the liquid crystal light-adjusting layer, respectively.

Optionally, in some embodiments of the present disclosure, the anti-peeping film further comprises:

a first alignment layer disposed on a side of the first electrode adjacent to the liquid crystal light-adjusting layer;

a second alignment layer disposed on a side of the second electrode adjacent to the liquid crystal light-adjusting layer.

Accordingly, the present disclosure further provides a display device comprising:

an anti-peeping film comprising:

at least two polarizers;

a liquid crystal light-adjusting layer disposed between two adjacent polarizers;

wherein optical axis directions of the at least two polarizers are parallel to each other, and in a first mode, an angle between long axes of liquid crystal molecules in the liquid crystal light-adjusting layer and planes in which the polarizers are located is an acute angle; and a display panel disposed on a side of one of the polarizers of the anti-peeping film far away from the liquid crystal light-adjusting layer.

Optionally, in some embodiments of the present disclosure, the display device further comprises:

a backlight source comprising a collimated light source;

a light guide plate disposed on a side of the anti-peeping film far away from the display panel, wherein the collimated light source is disposed on a side of the light guide plate.

Optionally, in some embodiments of the present disclosure, in the first mode, the angle between the long axes of the liquid crystal molecules in the liquid crystal light-adjusting layer and the planes in which the polarizers are located is greater than or equal to 50 degrees and less than or equal to 70 degrees.

Optionally, in some embodiments of the present disclosure, the planes in which the polarizers are located are a x-y plane composed of an x-axis and a y-axis, and a normal line direction of the polarizers is a z-axis direction perpendicular to the x-y plane; in the first mode, the long axes of the liquid crystal molecules in the liquid crystal light-adjusting layer are located in a y-z plane, and an angle between the long axes of the liquid crystal molecules and the y-axis is $\beta$; and light rays in a side-viewing direction of the anti-peeping film are located in a x-z plane, and an angle between the light rays in the side-viewing direction and the z-axis is $\theta$, wherein $\beta = \arctan((1+\tan\theta)/(2^{1/2}\tan\theta))$, and a value of $\beta$ is greater than or equal to 50 degrees and less than or equal to 70 degrees.

Optionally, in some embodiments of the present disclosure, in the first mode, the angle between the long axes of the liquid crystal molecules in the liquid crystal light-adjusting layer and the planes in which the polarizers are located is 62.63 degrees.

Optionally, in some embodiments of the present disclosure, the number of the polarizers is at least three, and the anti-peeping film comprises at least two liquid crystal light-adjusting layers; and in the first mode, orthographic projections of the long axes of the liquid crystal molecules in the at least two liquid crystal light-adjusting layers on the polarizers are parallel to each other.

Optionally, in some embodiments of the present disclosure, the liquid crystal light-adjusting layer at least comprises a first liquid crystal light-adjusting layer and a second liquid crystal light-adjusting layer, and in the first mode, there is an angle between orthographic projections of long axes of liquid crystal molecules in the first liquid crystal light-adjusting layer on the polarizers and orthographic projections of long axes of liquid crystal molecules in the second liquid crystal light-adjusting layer on the polarizers.

Beneficial Effect

The present disclosure provides an anti-peeping film and a display device, wherein the anti-peeping film comprises at least two polarizers; a liquid crystal light-adjusting layer disposed between two adjacent polarizers; wherein optical axis directions of the at least two polarizers are parallel to each other, and in a first mode, an angle between long axes of liquid crystal molecules in the liquid crystal light-adjusting layer and planes in which the polarizers are located is an acute angle. According to the present disclosure, in the first mode, by setting the angle between the long axes of the liquid crystal molecules in the liquid crystal light-adjusting layer and the planes in which the polarizers are located to be an acute angle, effective long axes of the liquid crystal molecules in the liquid crystal light-adjusting layer have an angle with a direction of polarized light in the side-viewing direction, so that light rays of the anti-peeping film in the side-viewing direction is darker to realize anti-peeping effect; while in a non-first mode, the light in all directions of the anti-peeping film is similar in brightness so that the anti-peeping film can be shared. Moreover, the liquid crystal light-adjusting layer is light-transmissive, thereby facilitating improvement of light utilization efficiency.

BRIEF DESCRIPTION OF THE DRAWINGS

In order to illustrate more clearly the technical solutions in the embodiments of the present disclosure, reference will now be made briefly to the accompanying drawings required for the description of the embodiments. It will be apparent that the accompanying drawings in the following description are merely some of the embodiments of the present disclosure, and other drawings may be made to those skilled in the art without involving any inventive effort.

EMBODIMENTS OF THE INVENTION

Figure 1:
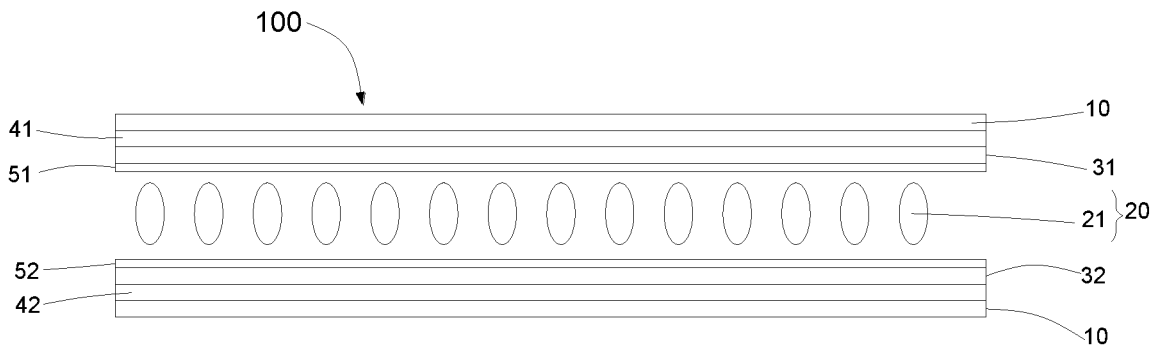
FIG. 1 is a schematic view of a first configuration of an anti-peeping film according to the present disclosure.

Technical solutions in embodiments of the present disclosure will be clearly and completely described below in conjunction with drawings in the embodiments of the present disclosure. It is apparent that the described embodiments are only a part of embodiments of the present disclosure, rather than all the embodiments. Based on the embodiments in the present disclosure, all other embodiments obtained by those skilled in the art without creative effort fall within the protection scope of the present disclosure.

In the description of the present disclosure, it should be understood that orientations or position relationships indicated by the terms "upper", "lower", "front", "rear", "left", "right", "inside", "outside" and the like are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include one or more of the features. In the description of the present disclosure, the meaning of "plural" is two or more, unless otherwise specifically defined.

The present disclosure provides an anti-peeping film and a display device, which are described in detail below. It should be noted that the described order of the following embodiments is not intended to limit the preferred order of the embodiments of the present disclosure.

Referring to FIG. 1, it is a first schematic structural view of an anti-peeping film 100 according to the present disclosure. An embodiment of the present disclosure further provides an anti-peeping film 100 including at least two polarizers 10 and a liquid crystal light-adjusting layer 20.

The liquid crystal light-adjusting layer 20 is disposed between two adjacent polarizers 10. Optical axes of the at least two polarizers 10 are parallel to each other. In a first mode, an angle between long axes of liquid crystal molecules 21 in the liquid crystal light-adjusting layer 20 and planes in which the polarizers 10 are located is an acute angle. The first mode is also an anti-peeping mode.

In the present disclosure, light brightness of the anti-peeping film 100 in a side-viewing direction is regulated by birefringence characteristics of the liquid crystal molecules 21, thereby achieving anti-peeping effect of the anti-peeping film 100 in the side-viewing direction. Specifically, in the first mode according to the present disclosure, the angle between the long axes of liquid crystal molecules 21 in the liquid crystal light-adjusting layer 20 and the planes in which the polarizers 10 are located is set as an acute angle, so that effective long axes of the liquid crystal molecules 21 in the liquid crystal light-adjusting layer 20 have an angle with the direction of polarized light in the side-viewing direction, and light ray F1 of the anti-peeping film 100 in the side-viewing direction is darker, thus achieving the anti-peeping effect. However, in a non-first mode, light brightness in all directions of the anti-peeping film 100 is mostly same as each other, so that sharing can be achieved. Moreover, the liquid crystal light-adjusting layer is light-transmissive, thereby facilitating improvement of utilization efficiency of light.

The principle of the above modes can be explained as follows: a half-wave plate has special optical characteristics, and two polarizers 10, which have optical axis directions parallel to each other, are respectively disposed on the upper and lower sides of the half-wave plate. When an incident direction of linearly polarized light passing through the polarizer 10 on the lower side is 45 degrees or −45 degrees from the long axis of the half-wave plate, a polarization direction F2 of linearly polarized light passing through the half-wave plate is rotated by exactly 90 degrees, so that the linearly polarized light is absorbed by the polarizer 10 located on the upper side. Therefore, the linearly polarized light passing through the polarizer 10 located on the lower side cannot be transmitted through the polarizer 10 located on the upper side.

Figure 2:
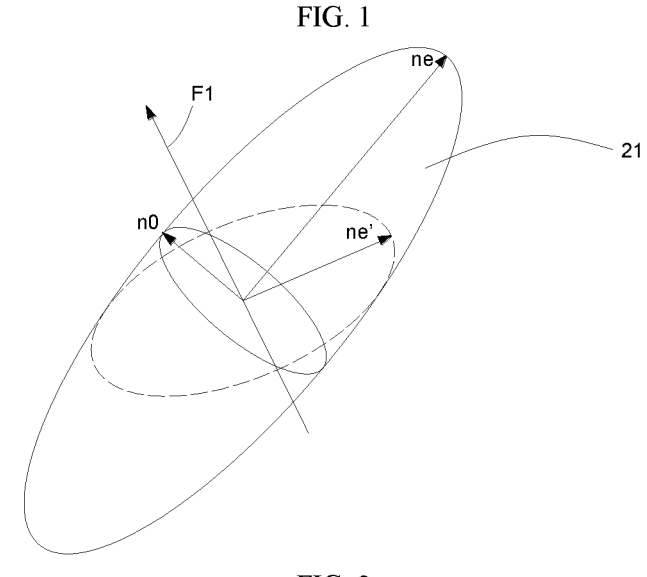
FIG. 2 is a schematic structural view showing a light ray and a liquid crystal molecule in a side-viewing direction of an anti-peeping film in a first mode, according to the present invention.
Figure 3:
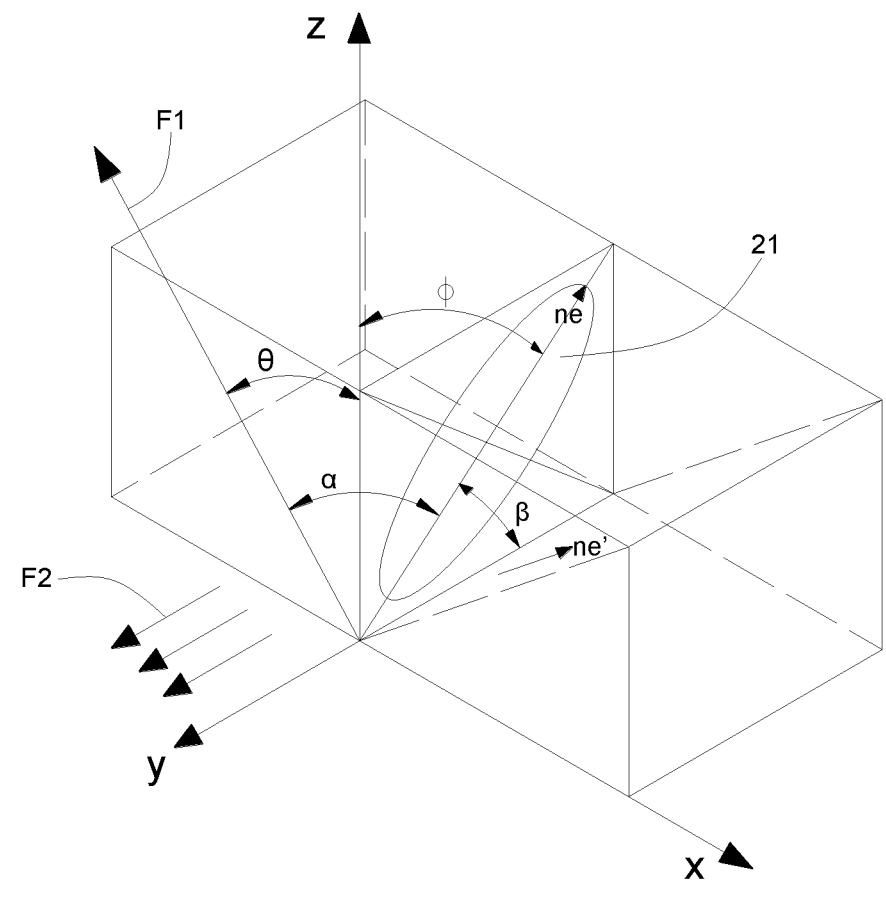
FIG. 3 is a model view of a light ray and a liquid crystal molecule in a side-viewing direction of an anti-peeping film in a first mode, according to the present invention.

The liquid crystal molecules 21 may form a half-wave plate using birefringence and dielectric characteristics thereof, and the liquid crystal molecules 21 may have switching characteristics. The formation of the half-wave plate by the liquid crystal light-adjusting layer 20 in the side-viewing direction of the anti-peeping film 100 requires the following two conditions: Condition 1, a phase delay difference of the liquid crystal light-adjusting layer 20 in the side-viewing direction of the anti-peeping film 100 is equal to a phase delay difference of the half-wave plate; Condition 2: in the side-viewing direction of the anti-peeping film 100, an angle between effective long axes of the liquid crystal molecules 21 and a vibration direction of linearly polarized light is 45 degrees. Specific implementations will be described with reference to FIGS. 2 and 3. FIG. 2 is a schematic structural view showing a light ray F1 and a liquid crystal molecule in a side-viewing direction of an anti-peeping film 100 in a first mode, according to an anti-peeping film of the present disclosure. FIG. 3 is a model view of light ray F1 and a liquid crystal molecule in a side-viewing direction of an anti-peeping film 100 in a first mode, according to an anti-peeping film of the present disclosure. For the birefringence characteristic of the liquid crystal molecule 21, ne is a refractive index in a long axis direction of the liquid crystal molecule 21, and no is a refractive index in a short-axis direction of the liquid crystal molecule 21. The polarizers are located in a x-y plane, and a normal line direction of the polarizers is a z-axis direction perpendicular to the x-y plane. The liquid crystal molecule 21 is located in a y-z plane, and an angle between the long axis of the liquid crystal molecule 21 and the y-axis is β. The Light ray F1 in the side-viewing direction of the anti-peeping film 100 is located in a x-z plane, and an angle between the light ray F1 and the z-axis is θ. An angle between the light ray F1 in the side-viewing direction of the anti-peeping film 100 and the long axis of the liquid crystal molecule 21 is a. In this case, the liquid crystal molecule 21 has the refractive index no and an effective refractive index ne' of a effective long axis, wherein $ne'=ne \times no \div (ne^2 \cos^2\alpha + no^2 \sin^2\alpha)^{1/2}$. A pointing vector of the effective long axis is located in a plane perpendicular to the light ray F1 in the side-viewing direction of the anti-peeping film 100, and an angle between the pointing vector of the effective long axis and a polarization direction F2 of linearly polarized light is γ. As described above, when a value of the angle γ is equal to 45 degrees, the angle β between the long axis of the liquid crystal molecule 21 and the y-axis meets $\beta=\arctan((1+\tan\theta)/(2^{1/2}\tan\theta))$, and the angle α between the light ray F1 in the side-viewing direction of the anti-peeping film 100 and the long axis of the liquid crystal molecule 21 meets $\alpha=\arccos(\cos\theta \times \sin(\arctan(((1+\tan\theta)/(2^{1/2}\tan\theta))))$. Meanwhile, the phase delay difference of the liquid crystal light-adjusting layer 20 is $2\pi(ne'-no) \, d'/\lambda$, wherein d' is a traveling distance of the linearly polarized light in the liquid crystal light-adjusting layer 20, ne' and no are refractive index parameters of the liquid crystal molecule 21, and λ is a wavelength. When a liquid crystal molecule 21 is selected, the refractive index parameters thereof cannot be changed. d' is related to a thickness d of the liquid crystal light-adjusting layer 20, i.e., d'=d/cos θ. Therefore, the phase delay difference 2π(ne'-no)d'/λ of the liquid crystal light-adjusting layer 20 may be selected to be equal to (2k+1)π (wherein, k=0, ±1, ±2 . . . ,) by changing d', thereby the liquid crystal light-adjusting layer 20 has a half-wave plate effect. That is, light passes through the polarizer 10 on the lower side of the liquid crystal light-adjusting layer 20 to form the linearly polarized light, which then enters the liquid crystal light-adjusting layer 20. In the side-viewing direction of the anti-peeping film 100, after the linearly polarized light passes through the liquid crystal light-adjusting layer 20, the polarization direction F2 of the linearly polarized light is rotated by just 90 degrees, so the linearly polarized light is absorbed by the polarizer 10 on the upper side of the liquid crystal light-adjusting layer 20. Therefore, the light ray passing through the polarizer 10 on the lower side of the liquid crystal light-adjusting layer 20 in the side-viewing direction of the anti-peeping film 100 cannot be transmitted through the polarizer 10 on the upper side of the liquid crystal light-adjusting layer 20, thereby achieving anti-peeping effect in the side-viewing direction of the anti-peeping film 100.

As can be seen from the above, the pointing vector of the effective long axis is located in the plane perpendicular to the light ray F1 in the side-viewing direction of the anti-peeping film 100. That is, angles between the pointing vector of the effective long axis and the polarization direction F2 of the linearly polarized light are different, at different angles in the side-viewing direction of the anti-peeping film 100. Therefore, light with different brightness levels may be seen at different angles of the side-viewing direction of the anti-peeping film 100, and thus different degrees of anti-peeping effect can be realized. When the angle between the pointing vector of the effective long axis and the polarization direction F2 of the linearly polarized light is 45 degrees, light passing through the polarizer 10 on the lower side of the liquid crystal light-adjusting layer 20 in the side-viewing direction of the anti-peeping film 100 cannot be transmitted through the polarizer 10 on the upper side of the liquid crystal light-adjusting layer 20, thereby achieving fully anti-peeping effect in the side-viewing direction of the anti-peeping film 100.

It is to be emphasized that the angle of the side-viewing direction is a known value. The anti-peeping effect of the anti-peeping film 100 will be described below by the brightness level of the anti-peeping film 100 seen at an angle of 30 degrees in the side-viewing direction. When the light ray F1 of the side-viewing direction of the anti-peeping film 100 is located in the x-z plane, and the angle θ between light ray F1 and the z-axis is 30 degrees, the angle β between the long axis of the liquid crystal molecule 21 and the y-axis is 62.63 degrees. In this case, the angle γ between the pointing vector of the effective long axis and the polarization direction F2 of the linearly polarized light is 45 degrees. The thickness d of the liquid crystal light-adjusting layer 20 is adjusted so that 2π(ne'-no) d'/λ is equal to (2k+1) π, wherein k=0, ±1, ±2 . . . . In this case, in the side-viewing direction of the anti-peeing film 100, specifically in a direction in which the angle between the pointing vector of the effective long axis of the liquid crystal light-adjusting layer 20 and the polarization direction F2 of the linearly polarized light is 45 degrees, the polarization direction F2 of the linearly polarized light is just rotated by 90 degrees. Therefore, when the angle between the pointing vector of the effective long axis and the polarization direction F2 of the linearly polarized light is 45 degrees, the light passing through the polarizer 10 on the lower side of the liquid crystal light-adjusting layer 20 in the side-viewing direction of the anti-peeping film 100 cannot be transmitted through the polarizer 10 on the upper side of the liquid crystal light-adjusting layer 20, thereby obtaining the optimum anti-peeping effect. It is not limited herein that the angle β must be 62.63 degrees. That is, it is not limited that the angle γ must be 45 degrees. For example, when the angle β is greater than 62.63 degrees, the angle γ is greater than 45 degrees. When the angle β is less than 62.63 degrees, the angle γ is less than 45 degrees. For example, when the angle γ is equal to 50 degrees, the polarization direction of the polarized light will be deflected by 100 degrees after the polarized light passes through the liquid crystal light-adjusting layer 20. An angle between the polarization direction of the polarized light and an absorption axis of the polarizer 10 is 10 degrees, which causes that most of the light may be absorbed by the polarizer 10 located on the upper side of the liquid crystal light-adjusting layer 20, and a small portion of the light is transmitted. By this arrangement, the brightness in the side-viewing direction is greatly reduced.

From the above, it can be seen that in order to achieve the optimum anti-peeping effect, the angle γ is required to be maintained at 45 degrees, and change in the angle θ also causes change of the angle β. When the light rays F1 in the side-viewing direction of the anti-peeping film 100 is located in the x-z plane, and the angle between the light ray F1 and the z axis is 30 degrees, the angle β is required to be increased to 62.63 degrees, in order to make the angle γ between the pointing vector of the effective long axis and the polarization direction F2 of the linearly polarized light be 45 degrees, thereby achieving the optimum anti-peeping effect.

The thickness d of the liquid crystal layer is not limited herein, and d will change greatly depending on different types of liquid crystal molecules selected (wherein liquid crystal parameters thereof are the refractive index parameters of the liquid crystal molecule 21) and the different angles β between the long axis of the liquid crystal molecule 21 and the y axis. In addition, the implementation of the angle β between the long axis of the liquid crystal molecule 21 and the y axis is not limited herein, and can be achieved by electric fields, alignment materials, microstructures, etc. Experimental Test Data is Illustrated Below:

Based on the above-described structure of the anti-peeping film 100, the angle β between the long axis of the liquid crystal molecule 21 in the liquid crystal light-adjusting layer 20 of the anti-peeping film 100 and the y axis is adjusted to a set value, and a lighting source is disposed on a side of the anti-peeping film 100 to provide a light source, so that the anti-peeping film 100 can actually obtain the following anti-peeping effects. The following table shows a brightness comparison seen at a plurality of viewing angles only in the case of the lighting source, and a comparison seen at a plurality of viewing angles in the case of a combination of the lighting source and the anti-peeping film 100:

| Viewing angle | 75° | 60° | 45° | 30° | 15° | 0° | −15° | −30° | −45° | −60° | −75° |
|---|---|---|---|---|---|---|---|---|---|---|---|
| Brightness of the lighting source | 8.56% | 9.49% | 15.41% | 38.60% | 76.12% | 100.00% | 73.93% | 38.60% | 15.12% | 9.83% | 8.64% |
| Brightness of the lighting source and the anti-peeping film 100 | 2.15% | 2.22% | 1.43% | 12.36% | 58.47% | 100.00% | 57.36% | 12.31% | 1.58% | 2.43% | 1.82% |

As can be seen from the table, in the case where the lighting source and the anti-peeping film 100 are used in combination, the brightness seen at the angles of the side-viewing direction of the anti-peeping film 100 is less than the brightness seen at the angle of the front-viewing direction of the anti-peeping film 100, whereby the anti-peeping film 100 of the present disclosure has a good anti-peeping effect in the side-viewing direction.

Specifically, in this embodiment, the anti-peeping film 100 includes two polarizers 10 and a liquid crystal light-adjusting layer 20.

The liquid crystal light-adjusting layer 20 is disposed between the two polarizers 10.

In some embodiments, in the first mode, the angle between the long axes of the liquid crystal molecules 21 in the liquid crystal light-adjusting layer 20 and planes in which the polarizers 10 are located is greater than or equal to 50 degrees and less than or equal to 70 degrees. Further, the planes in which the polarizers are located are an x-y plane composed of an x-axis and an y-axis, and a normal line direction of the polarizer is an z-axis direction perpendicular to the x-y plane. In the first mode, the long axes of the liquid crystal molecules in the liquid crystal light-adjusting layer are located in the y-z plane, and the long axes has an angle β from the y axis. Light in the side-viewing direction of the anti-peeping film is located in the x-z plane, and has an angle θ from the z-axis, wherein $\beta=\arctan((1+\tan\theta)/(2^{1/2}\tan\theta))$ and the value of β is greater than or equal to 50 degrees and less than or equal to 70 degrees.

That is, in the first mode, the angle between the long axes of the liquid crystal molecules 21 in the liquid crystal light-adjusting layer 20 and the planes in which the polarizers 10 are located is the same as the angle between the long axes of the liquid crystal molecules 21 in the liquid crystal light-adjusting layer 20 and the y axis, and the angle β between the long axes of the liquid crystal molecules 21 in the liquid crystal light-adjusting layer 20 and the y axis is greater than or equal to 50 degrees and less than or equal to 70 degrees, therefore correspondingly, an anti-peeping angle in the side-viewing direction of the anti-peeping film is between 55 degrees and 20 degrees. Specifically, when in the first mode, the angle between the long axes of the liquid crystal molecules 21 in the liquid crystal light-adjusting layer 20 and the y axis is 50 degrees, and the light ray F1 in the side-viewing direction of the anti-peeping film 100 is located in the x-z plane and the angle θ between the light ray F1 and the z axis is 55 degrees. In this case, the angle γ between the pointing vector of the effective long axis and the polarization direction F2 of the linearly polarized light is 45 degrees, thereby obtaining the best anti-peeping effect. When in the first mode, the angle between the long axes of the liquid crystal molecules 21 in the liquid crystal light-adjusting layer 20 and the y axis is 70 degrees, and the light ray F1 in the side-viewing direction of the anti-peeping film 100 is located in the x-z plane and the angle θ between the light ray F1 and the z axis is 20 degrees. In this case, the angle γ between the pointing vector of the effective long axis and the polarization direction F2 of the linearly polarized light is 45 degrees, thereby obtaining the best anti-peeping effect. In particular, when in the first mode, light in the side-viewing direction of the anti-peeping film is located in the x-z plane and an angle between the light ray and the z axis is θ, and the brightness of the anti-peeping film in the side-viewing direction is less than 13%.

At present, the conventional side-viewing anti-peeping angle of a common display product is between 45 degrees and 60 degrees. However, considering the relationship between the position of a vehicle-mounted display product and the driver's seat or the sub-driver's seat, the side-viewing anti-peeping angle of the vehicle-mounted display product is mostly required at about 30 degrees. Therefore, the angle between the long axes of the liquid crystal molecules in the liquid crystal light-adjusting layer and the planes in which the polarizers are located is between 50 degrees and 70 degrees. In this case, the light rays in the side-viewing direction of the anti-peeping film are located in the x-z plane and the angle between the light rays and the z axis is between 55 degrees and 20 degrees. That is, the anti-peeping angle of the anti-peeping film in the side-viewing direction is between 55 degrees and 20 degrees, which is more suitable for a use scenario of the vehicle-mounted display product. Therefore, in the first mode, the angle β between the long axes of the liquid crystal molecules 21 in the liquid crystal light-adjusting layer 20 and the y axis is set to be greater than or equal to 50 degrees and less than or equal to 70 degrees, and it is more conducive to preventing peeping.

Further, in the first mode, the angle between the long axes of the liquid crystal molecules 21 in the liquid crystal light-adjusting layer 20 and the planes in which the polarizers 10 are located is 62.63 degrees. In this case, when the light ray F1 of the anti-peeping film 100 in the side-viewing direction is located in the x-z plane and the angle θ between the light ray F1 and the z axis is 30 degrees, the angle γ between the pointing vector of the effective long axis and the polarization direction F2 of the linearly polarized light can be 45 degrees, thereby obtaining the best anti-peeping effect. In the first mode, if the angle between the long axes of the liquid crystal molecules 21 in the liquid crystal light-adjusting layer 20 and the planes in which the polarizers 10 are located is greater than or equal to 50 degrees and less than or equal to 62.63 degrees, and the anti-peeping angle in the side-viewing direction of the anti-peeping film is between 30 degrees and 20 degrees. In the first mode, if the angle between the long axes of the liquid crystal molecules 21 in the liquid crystal light-adjusting layer 20 and the planes in which the polarizers 10 are located in greater than or equal to 62.63 degrees and less than or equal to 70 degrees, the anti-peeping angle in the side-viewing direction of the anti-peeping film is between 55 degrees and 30 degrees.

In some embodiments, the thickness of the liquid crystal light-adjusting layer 20 ranges from 2 microns to 7 microns. Excessive thickness of the liquid crystal light-adjusting layer 20 will not only lead to excessive liquid crystal gravity, but also increase the difficulty of the manufacturing process. In both cases, uneven display effect is likely to occur. Therefore, the thickness of the liquid crystal light-adjusting layer 20 should not be too thick, and the thickness of the liquid crystal light-adjusting layer 20 is further in the range of 3 microns to 5 microns. By setting the thickness of the liquid crystal light-adjusting layer 20 to be between 2 microns and 7 microns, or even between 3 microns and 5 microns, it not only has a better anti-peeping effect, but also reduces the difficulty of the manufacturing process and avoids generation of display unevenness.

In some embodiments, in a second mode, an angle between the long axes of the liquid crystal molecules 21 in the liquid crystal light-adjusting layer 20 and the normal line of one of the polarizers 10 is φ, wherein φ is greater than or equal to 87 degrees and less than or equal to 90 degrees, or q is greater than or equal to 0 degrees and less than or equal to 5 degrees. The second mode is a sharing mode. As an optimal effect, in the second mode, the long axes of the liquid crystal molecules 21 in the liquid crystal light-adjusting layer are arranged in a direction perpendicular to or parallel to the normal lines of the polarizers 10. That is, the angle between the long axes of the liquid crystal molecules 21 in the liquid crystal light-adjusting layer and the normal lines of the polarizers 10 is 90 degrees or zero degrees. The liquid crystal molecules 21 are negative liquid crystal molecules 21 or positive liquid crystal molecules 21. Specifically, in the second mode, when the liquid crystal molecules 21 are positive liquid crystal molecules 21, a value of φ is greater than or equal to 87 degrees and less than or equal to 90 degrees. When the liquid crystal molecules 21 are negative liquid crystal molecules 21, a value of φ is greater than or equal to zero degrees and less than or equal to 5 degrees.

In some embodiments, the anti-peeping film 100 further comprises:
a first electrode 31;
a second electrode 32 disposed opposite to the first electrode 31.
The liquid crystal light-adjusting layer 20 is disposed between the first electrode 31 and the second electrode 32.

The polarizers 10 are disposed on sides of the first electrode 31 and the second electrode 32 far away from the liquid crystal light-adjusting layer 20, respectively. The first electrode 31 and the second electrode 32 may be a whole electrode, or a plurality of electrode plates arranged at intervals, respectively.

In some embodiments, the anti-peeping film 100 further comprises:
a first alignment layer 51 disposed on a side of the first electrode 31 adjacent to the liquid crystal light-adjusting layer 20;
a second alignment layer 52 disposed on a side of the second electrode 32 adjacent to the liquid crystal light-adjusting layer 20.

The liquid crystal molecules 21 in the liquid crystal light-adjusting layer 20 are pre-aligned by the first alignment layer 51 and the second alignment layer 52. The first alignment layer 51 and the second alignment layer 52 comprise a polyimide alignment film.

In some embodiments, the anti-peeping film 100 further comprises:
a first substrate 41 disposed on a side of the first electrode 31 far away from the liquid crystal light-adjusting layer 20;
a second substrate 42 disposed on a side of the second electrode 32 far away from the liquid crystal light-adjusting layer 20. Specifically, the polarizers 10 are disposed on sides of the first substrate 41 and the second substrate 42 far away from the liquid crystal light-adjusting layer 20, respectively.

The first substrate 41 and the second substrate 42 are disposed to support the first electrode 31 and the second electrode 32, respectively, wherein the materials for forming the first substrate 41 and the second substrate 42 may be glass, polyester resin, transparent polyimide, ultra-thin glass, or the like.

Figure 4:
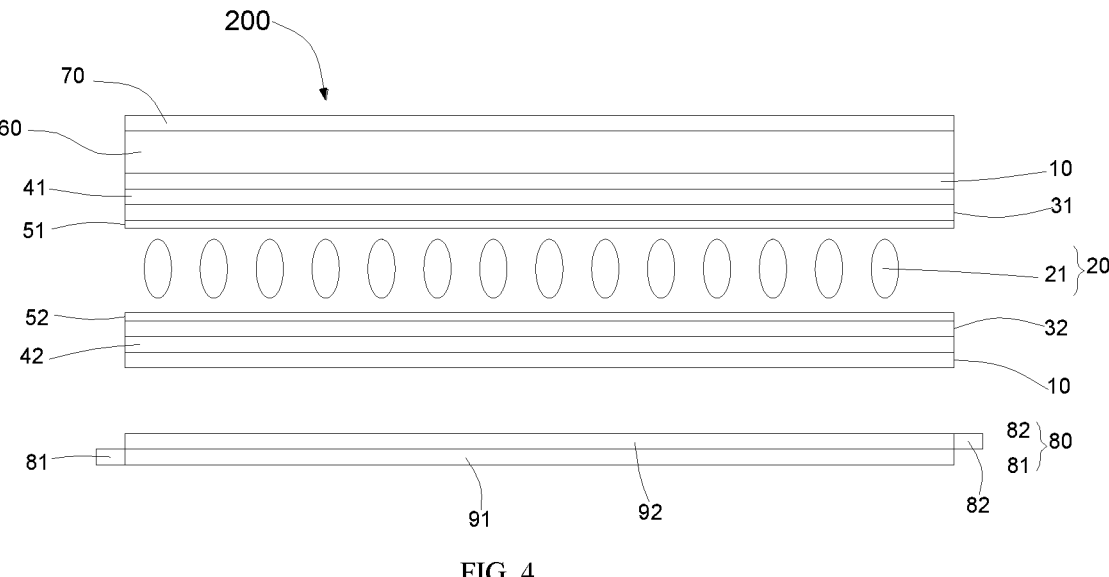
FIG. 4 is a schematic view of a display device according to the present disclosure.

Referring to FIG. 4, it is a schematic view of a display device 200 according to the present disclosure. An embodiment of the present disclosure further provides the display device 200 including the above-described anti-peeping film 100 and a display panel 60, wherein the display panel 60 is disposed on a side of one of the polarizers 10 far away from the liquid crystal light-adjusting layer 20.

The display device 200 solves the problems in a similar way to the anti-peeping film 100 described above. Therefore, the implementation and advantageous effects of the display device 200 can be found the description of the anti-peeping film 100 described above, and details are not described herein again.

The display device 200 further includes a display polarizer 70, wherein the display polarizer 70 is disposed on a side of the display panel 60 far away from the liquid crystal light-adjusting layer 20, and the optical axis direction of the display polarizer 70 is perpendicular to the optical axis direction of the polarizers 10.

Reference is made to the following table, which is a brightness comparison of the display device 200 at multiple viewing angles.

| Viewing angle | 75° | 60° | 45° | 30° | 15° | 0° | −15° | −30° | −45° | −60° | −75° |
|---|---|---|---|---|---|---|---|---|---|---|---|
| Brightness of display device 200 | 0.03% | 0.09% | 0.24% | 1.06% | 22.83% | 100.00% | 22.72% | 0.93% | 0.22% | 0.07% | 0.02% |

It can be seen from the brightness comparison of the display device 200 at multiple viewing angles that, the display device 200 with the anti-peeping film 100 of the present invention has a very good anti-peeping effect in the side-viewing direction.

The display device 200 further includes a backlight source 80 disposed on a side of the anti-peeping film 100 far away from the display panel 60. The backlight source 80 is a collimated light source 82 or a diverging light source 81. The collimated light source 82 can emit collimated light, which can be realized using a reverse prism backlight, a collimated film, a collimated lens, and the like. The collimated light source 82 has a better display effect, and advantageously reduces the loss of light in the transfer process.

The backlight source 80 includes the collimated light source 82 and the diverging light source 81. The display device 200 further includes a first light guide plate 91 and a second light guide plate 92, wherein the first light guide plate 91 and the second light guide plate 92 are stacked in sequence on a side of the anti-peeping film 100 far away from the display panel 60. The diverging light source 81 is disposed on a side surface of the first light guide plate 91, and the collimated light source 82 is disposed on a side surface of the second light guide plate 92.

The backlight source 80 may selectively emit diverging light or collimated light, wherein the first light guide plate 91 may emit diverging light, and the second light guide plate 92 may emit collimated light. In the anti-peeping mode, the first light guide plate 91 is operated, that is, the incident light of the anti-peeping film 100 is diverging light; and in the sharing mode, the second light guide plate 92 is operated, that is, the incident light of the anti-peeping film 100 is collimated light. It is to be emphasized that, it is not limited that only one light guide plate is operated in the anti-peeping mode or the sharing mode, but the first light guide plate 91 and the second light guide plate 92 are operated at the same time according to actual requirements.

In some embodiments, in the first mode, the angle between the long axes of the liquid crystal molecules 21 in the liquid crystal light-adjusting layer 20 and the planes in which the polarizers 10 are located is greater than or equal to 50 degrees and less than or equal to 70 degrees. Further, the planes in which the polarizers are located is the x-y plane, which is composed of the x-axis and the y-axis, and a normal line direction of the polarizers is the z-axis direction perpendicular to the x-y plane. In the first mode, the long axes of the liquid crystal molecules in the liquid crystal light-adjusting layer is located in the y-z plane and has an angle $\beta$ with the y axis, the light rays in the side-viewing direction of the anti-peeping film are located in the x-z plane and have an angle $\theta$ with the z-axis, wherein $\beta = \arctan((1+\tan \theta)/(2^{1/2} \tan \theta))$ and the value of $\beta$ is greater than or equal to 50 degrees and less than or equal to 70 degrees. In particular, in the first mode, the light ray in the side-viewing direction of the anti-peeping film is located in the x-z plane and has an angle $\theta$ with the z axis, and the brightness of the display device 200 in the side-viewing direction is less than 1.2%.

Figure 5:
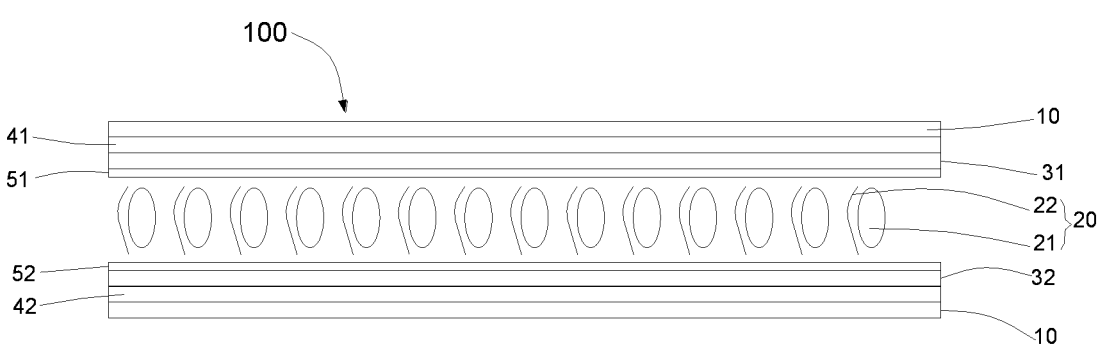
FIG. 5 is a schematic view of a second configuration of an anti-peeping film according to the present disclosure.

Referring to FIG. 5, it is a schematic view of a second configuration of an anti-peeping film 100 according to the present disclosure. The difference between this embodiment and the anti-peeping film 100 in FIG. 1 according to the present disclosure is that, the liquid crystal light-adjusting layer 20 includes a polymer network 22 and liquid crystal molecules 21 distributed in the polymer network 22. When the liquid crystal molecules 21 are pre-aligned, the liquid crystal molecules 21 may be tilted to a predetermined angle by an electric field, and then a polymer in the liquid crystal light-adjusting layer is cured by ultraviolet light or the like to form the polymer network 22. After the electric field is removed, the polymer network 22 keeps the liquid crystal molecules 21 tilted at a predetermined angle. In the above case, an optimal setting angle may be selected according to actual requirements, and then the polymer network 22 is used to keep the liquid crystal molecules 21 tilted at the setting angle. Specifically, the setting angle may be such that the angle between the long axes of the liquid crystal molecules 21 in the liquid crystal light-adjusting layer and the planes in which the polarizers 10 are located is 50 to 70 degrees. In this case, the anti-peeping film 100 is in the first mode.

Figure 6:
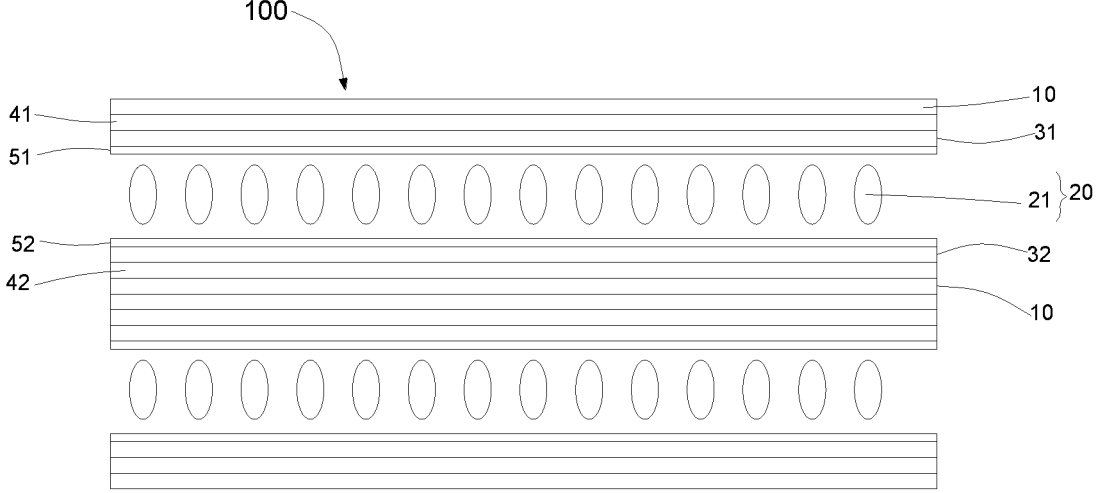
FIG. 6 is a schematic view of a third configuration of an anti-peeping film according to the present disclosure.

Referring to FIG. 6, it is a schematic view of a third configuration of an anti-peeping film 100 according to the present disclosure. Since the liquid crystal light-adjusting layer 20 is disposed between two adjacent polarizers 10, when the number of the polarizers 10 is at least three, the number of the liquid crystal light-adjusting layers 20 is at least two. In practical use, a single liquid crystal light-adjusting layer 20 cannot achieve a theoretical anti-peeping effect, and a plurality of liquid crystal light-adjusting layers 20 therefore can be disposed. The plurality of liquid crystal light-adjusting layers 20 may be used to enhance the anti-peeping effect, so that the anti-peeping film 100 has an anti-peeping effect close to the theoretical effect. The difference between this embodiment and the anti-peeping film 100 in FIG. 1 according to the present disclosure is that: the number of the polarizers 10 is at least three, and accordingly, the number of the liquid crystal light-adjusting layers 20 is at least two. In the first mode, orthographic projections of the long axes of the liquid crystal molecules 21 in the at least two liquid crystal light-adjusting layers 20 on the polarizers 10 are parallel to each other.

Specifically, the number of the polarizers 10 is three, and accordingly, the number of the liquid crystal light-adjusting layers 20 is two. In the first mode, orthographic projections of the long axes of the liquid crystal molecules 21 in the two liquid crystal light-adjusting layers 20 on the polarizers 10 are parallel to each other.

Figure 7:
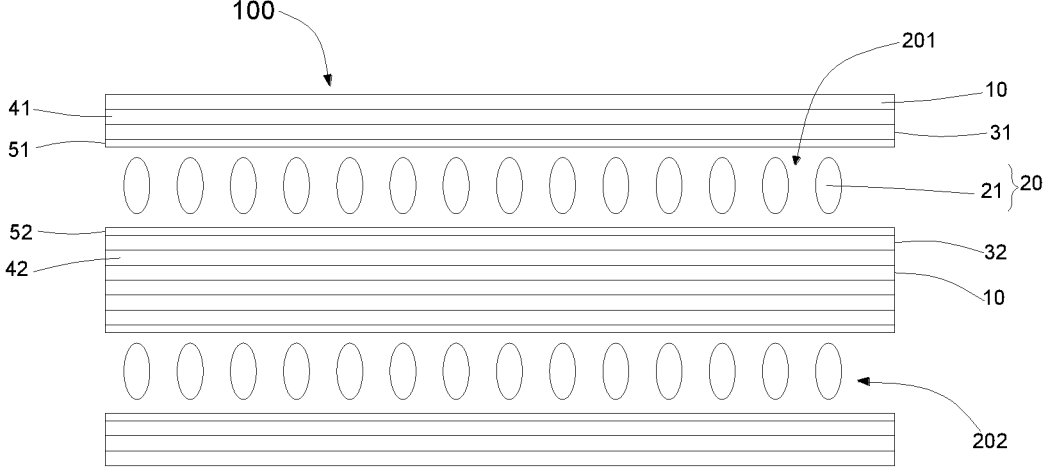
FIG. 7 is a schematic view of a fourth configuration of an anti-peeping film according to the present disclosure.

Referring to FIG. 7, it is a schematic view of a fourth configuration of an anti-peeping film 100 according to the present disclosure. The difference between this embodiment and the anti-peeping film of FIG. 1 according to the present disclosure is that, the liquid crystal light-adjusting layers 20 includes at least a first liquid crystal light-adjusting layer 201 and a second liquid crystal light-adjusting layer 202. In the first mode, there is an angle between orthographic projections of the long axes of the liquid crystal molecules 21 in the first liquid crystal light-adjusting layer 201 on the polarizers 10 and orthographic projections of the long axes of the liquid crystal molecules 21 in the second liquid crystal light-adjusting layer 202 on the polarizers 10.

In the first mode, when the liquid crystal molecules 21 in the liquid crystal light-adjusting layer 20 of the anti-peeping film 100 are located in the y-z plane, and the angle between the long axes of the liquid crystal molecules 21 and the y axis is $\beta$, the anti-peeping film 100 has an anti-peeping effect in the side-viewing direction on both sides of the y axis. Therefore, in the first mode, when there is only one tilted direction of the liquid crystal molecules 21 in the liquid crystal light-adjusting layer 20 of the anti-peeping film 100, it is possible to realize anti-peeping effect in only two directions. In order to achieve a larger anti-peeping angle, it is necessary to arrange the liquid crystal molecules 21 in the liquid crystal light-adjusting layer 20 of the anti-peeping film 100 to be tilted in a plurality of directions, in the first mode.

Therefore, in the present embodiment, there is an angle between the orthographic projections of the long axes of liquid crystal molecules 21 in the first liquid crystal light-adjusting layer 201 on the polarizers 10 and the orthographic projections of the long axes of liquid crystal molecules 21 in the second liquid crystal light-adjusting layer 202 on the polarizers 10. Thus, a larger anti-peeping angle can be obtained. For example, in the first mode, the liquid crystal molecules 21 in the first liquid crystal light-adjusting layer 201 of the anti-peeping film 100 are located in the y-z plane, and the angle between the long axes of the liquid crystal molecules 21 and the y-axis is $\beta$, so the first liquid crystal light-adjusting layer 201 of the anti-peeping film 100 has an anti-peeping effect in the side-viewing direction on both sides of the y-axis. The liquid crystal molecules 21 in the second liquid crystal light-adjusting layer 202 of the anti-peeping film 100 are not in the y-z plane, and there is an angle between the orthographic projections of the long axes of liquid crystal molecules 21 in the first liquid crystal light-adjusting layer 201 on the polarizers 10 and the orthographic projections of the long axes of the liquid crystal molecules 21 in the second liquid crystal light-adjusting layer 202 on the polarizers 10. Therefore, an anti-peeping angle of the second liquid crystal light-adjusting layer 202 of the anti-peeping film 100 is different from an anti-peeping angle of the first liquid crystal light-adjusting layer 201 of the anti-peeping film 100. Therefore, an anti-peeping angle of the anti-peeping film 100 is a combination of the anti-peeping angle of the second liquid crystal light-adjusting layer 202 and the anti-peeping angle of the first liquid crystal light-adjusting layer 201, thereby obtaining a larger anti-peeping angle.

Further, in the first mode, the orthographic projections of the long axes of the liquid crystal molecules 21 in the first liquid crystal light-adjusting layer 201 on the polarizers 10 is perpendicular to the orthographic projections, of the long axes of the liquid crystal molecules 21 in the second liquid crystal light-adjusting layer 202 on the polarizers 10. In this case, in the first mode, the liquid crystal molecules 21 in the first liquid crystal light-adjusting layer 201 of the anti-peeping film 100 are located in the y-z plane, and the angle between the long axes of the liquid crystal molecules 21 and the y axis is β, the first liquid crystal light-adjusting layer 201 of the anti-peeping film 100 has an anti-peeping effect in the side-viewing direction on both sides of the y axis; the liquid crystal molecules 21 in the second liquid crystal light-adjusting layer 202 of the anti-peeping film 100 are in the x-z plane, and the angle between the liquid crystal molecules 21 and the x-axis is β, the second liquid crystal light-adjusting layer 202 of the anti-peeping film 100 has an anti-peeping effect in the side-viewing direction on both sides of the x-axis. The anti-peeping angle of the anti-peeping film 100 is a combination of the anti-peeping angle of the second liquid crystal light-adjusting layer 202 and the anti-peeping angle of the first liquid crystal light-adjusting layer 201. Therefore, the anti-peeping film 100 can realize anti-peeping effect in four directions, namely, a front-viewing direction, a back-viewing direction, a left-viewing direction, and a right-viewing direction.

Figure 8:
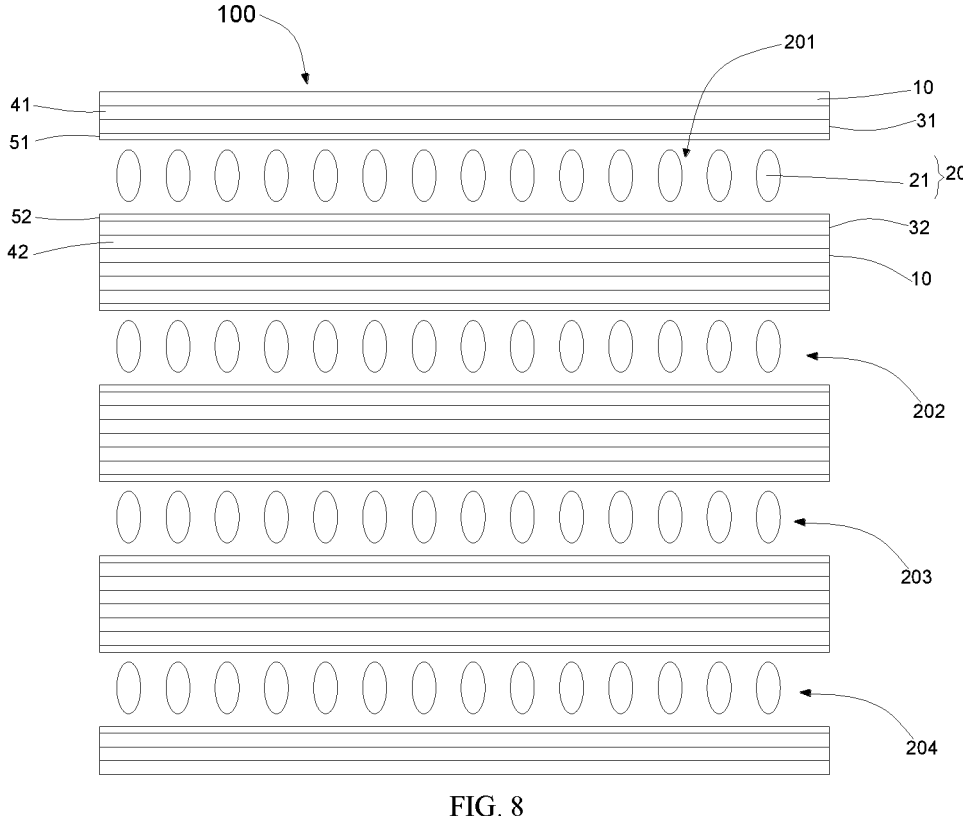
FIG. 8 is a schematic view of a fifth configuration of an anti-peeping film according to the present disclosure.

Referring to FIG. 8, it is a schematic view of a fifth configuration of an anti-peeping film 100 according to the present disclosure. The difference between this embodiment and the anti-peeping film 100 of FIG. 7 according to the present embodiment is that, the liquid crystal light-adjusting layers 20 further include:

a third liquid crystal light-adjusting layer 203. In the first mode, the orthographic projections of the long axes of the liquid crystal molecules 21 in the first liquid crystal light-adjusting layer 201 on the polarizers 10 is parallel to the orthographic projections of the long axes of the liquid crystal molecules 21 in the third liquid crystal light-adjusting layer 203 on the polarizers 10. In practical use, since a single liquid crystal light-adjusting layer 20 cannot reach a theoretical anti-peeping effect, a plurality of liquid crystal light-adjusting layers 20 can be disposed to enhance the anti-peeping effect, so that the anti-peeping film 100 has an anti-peeping effect close to the theoretical anti-peeping effect. Therefore, the first liquid crystal light-adjusting layer 201 and the third liquid crystal light-adjusting layer 203 are disposed. In the first mode, the long axes of the liquid crystal molecules 21 in the first liquid crystal light-adjusting layer 201 and the third liquid crystal light-adjusting layer 203 are tilted in the same direction, so that the anti-peeping effect of the anti-peeping film 100 in a certain direction can be enhanced.

Further, in some embodiments, the liquid crystal light-adjusting layers 20 further comprise:

a fourth liquid crystal light-adjusting layer 204. In the first mode, the orthographic projections of the long axes of the liquid crystal molecules 21 in the second liquid crystal light-adjusting layer 202 on the polarizers 10 is parallel to the orthographic projections of the long axes of the liquid crystal molecules 21 in the fourth liquid crystal light-adjusting layer 204 on the polarizers 10. The second liquid crystal light-adjusting layer 202 and the fourth liquid crystal light-adjusting layer 204 are disposed, and in the first mode, the long axes of the liquid crystal molecules 21 in the second liquid crystal light-adjusting layer 202 and the fourth liquid crystal light-adjusting layer 204 are tilted in the same direction, so that the anti-peeping effect of the anti-peeping film 100 in a certain direction can be enhanced.

Further, the first liquid crystal light-adjusting layer 201 and the second liquid crystal light-adjusting layer 202 may be provided adjacent to each other, or may not be provided adjacent to each other. In the present embodiment, the first liquid crystal light-adjusting layer 201 and the second liquid crystal light-adjusting layer 202 are two adjacent liquid crystal light-adjusting layers 20.

The anti-peeping film and the display device provided by the embodiments of the present disclosure have been introduced in detail above. Specific examples are used herein to illustrate the principles and implementations of the present invention. The description of the above embodiments is merely provided to assist in understanding the method of the present disclosure and the core idea thereof. Meanwhile, there will be changes in the specific implementation and application scope according to the idea of the present disclosure for those skilled in the art. In summary, the content of this specification should not be construed as limiting the present disclosure.

What is claimed is:

1. An anti-peeping film, comprising:
    at least two polarizers; and
    a liquid crystal light-adjusting layer disposed between two adjacent polarizers;
    wherein optical axis directions of the at least two polarizers are parallel to each other, and in a first mode, an angle between long axes of liquid crystal molecules in the liquid crystal light-adjusting layer and planes in which the polarizers are located is an acute angle, and the planes in which the polarizers are located are a x-y plane composed of an x-axis and a y-axis, and a normal line direction of the polarizers is a z-axis direction perpendicular to the x-y plane; in the first mode, the long axes of the liquid crystal molecules in the liquid crystal light-adjusting layer are located in a y-z plane, and an angle between the long axes of the liquid crystal molecules and the y-axis is β; and light rays in a side-viewing direction of the anti-peeping film are located in a x-z plane, and an angle between the light rays in the side-viewing direction and the z-axis is θ, wherein $\beta=\arctan((1+\tan\theta)/(2^{1/2}\tan\theta))$, and a value of β is greater than or equal to 50 degrees and less than or equal to 70 degrees.

2. The anti-peeping film according to claim 1, wherein in the first mode, the angle between the long axes of the liquid crystal molecules in the liquid crystal light-adjusting layer and the planes in which the polarizers are located is greater than or equal to 50 degrees and less than or equal to 70 degrees.

3. The anti-peeping film according to claim 2, wherein in the first mode, the angle between the long axes of the liquid crystal molecules in the liquid crystal light-adjusting layer and the planes in which the polarizers are located is 62.63 degrees.

4. The anti-peeping film according to claim 1, wherein the number of the polarizers is at least three, and the anti-peeping film comprises at least two liquid crystal light-adjusting layers; and in the first mode, orthographic projections of the long axes of the liquid crystal molecules in the at least two liquid crystal light-adjusting layers on the polarizers are parallel to each other.

5. The anti-peeping film according to claim 1, wherein the liquid crystal light-adjusting layers at least comprise a first liquid crystal light-adjusting layer and a second liquid crystal light-adjusting layer, and in the first mode, there is an angle between orthographic projections of long axes of liquid crystal molecules in the first liquid crystal light-adjusting layer on the polarizers and orthographic projections of long axes of liquid crystal molecules in the second liquid crystal light-adjusting layer on the polarizers.

6. The anti-peeping film according to claim 5, wherein in the first mode, the orthographic projections of the long axes of the liquid crystal molecules in the first liquid crystal light-adjusting layer on the polarizers is perpendicular to the orthographic projections of the long axes of the liquid crystal molecules in the second liquid crystal light-adjusting layer on the polarizers.

7. The anti-peeping film according to claim 6, wherein the liquid crystal light-adjusting layers further comprises:

a third liquid crystal light-adjusting layer, wherein in the first mode, the orthographic projections of the long axes of the liquid crystal molecules in the first liquid crystal light-adjusting layer on the polarizers is parallel to orthographic projections of long axes of liquid crystal molecules in the third liquid crystal light-adjusting layer on the polarizers.

8. The anti-peeping film according to claim 6, wherein the liquid crystal light-adjusting layers further comprises:

a fourth liquid crystal light-adjusting layer, wherein in the first mode, the orthographic projections of the long axes of the liquid crystal molecules in the second liquid crystal light-adjusting layer on the polarizers is parallel to orthographic projections of long axes of liquid crystal molecules in the fourth liquid crystal light-adjusting layer on the polarizers.

9. The anti-peeping film according to claim 1, wherein a thickness of the liquid crystal light-adjusting layer is in a range of 2 microns to 7 microns.

10. The anti-peeping film according to claim 1, wherein in s second mode, an angle between the long axes of the liquid crystal molecules in the liquid crystal light-adjusting layer and a normal line of the polarizers is φ, wherein φ is greater than or equal to 87 degrees and less than or equal to 90 degrees, or φ is greater than or equal to 0 degrees and less than or equal to 5 degrees.

11. The anti-peeping film according to claim 1, wherein the anti-peeping film further comprises:

a first electrode; and a second electrode disposed opposite to the first electrode;

wherein the liquid crystal light-adjusting layer is disposed between the first electrode and the second electrode; and the polarizers are disposed on sides of the first electrode and the second electrode far away from the liquid crystal light-adjusting layer, respectively.

12. The anti-peeping film according to claim 11, wherein the anti-peeping film further comprises:

a first alignment layer disposed on a side of the first electrode adjacent to the liquid crystal light-adjusting layer; and a second alignment layer disposed on a side of the second electrode adjacent to the liquid crystal light-adjusting layer.

13. A display device, comprising:

an anti-peeping film comprising:

at least two polarizers;

a liquid crystal light-adjusting layer disposed between two adjacent polarizers;

wherein optical axis directions of the at least two polarizers are parallel to each other, and in a first mode, an angle between long axes of liquid crystal molecules in the liquid crystal light-adjusting layer and planes in which the polarizers are located is an acute angle, the planes in which the polarizers are located are a x-y plane composed of an x-axis and a y-axis, and a normal line direction of the polarizers is a z-axis direction perpendicular to the x-y plane; in the first mode, the long axes of the liquid crystal molecules in the liquid crystal light-adjusting layer are located in a y-z plane, and an angle between the long axes of the liquid crystal molecules and the y-axis is B; and light rays in a side-viewing direction of the anti-peeping film are located in a x-z plane, and an angle between the light rays in the side-viewing direction and the z-axis is θ, wherein $\beta=\arctan((1+\tan\theta)/(2^{1/2}\tan\theta))$, and a value of β is greater than or equal to 50 degrees and less than or equal to 70 degrees; and a display panel disposed on a side of one of the polarizers of the anti-peeping film far away from the liquid crystal light-adjusting layer.

14. The display device according to claim 13, wherein the display device further comprises:

a backlight source comprising a collimated light source;

a light guide plate disposed on a side of the anti-peeping film far away from the display panel, wherein the collimated light source is disposed on a side of the light guide plate.

15. The display device according to claim 13, wherein in the first mode, the angle between the long axes of the liquid crystal molecules in the liquid crystal light-adjusting layer and the planes in which the polarizers are located is greater than or equal to 50 degrees and less than or equal to 70 degrees.

16. The display device according to claim 15, wherein in the first mode, the angle between the long axes of the liquid crystal molecules in the liquid crystal light-adjusting layer and the planes in which the polarizers are located is 62.63 degrees.

17. The display device according to claim 13, wherein the number of the polarizers is at least three, and the anti-peeping film comprises at least two liquid crystal light-adjusting layers; and in the first mode, orthographic projections of the long axes of the liquid crystal molecules in the at least two liquid crystal light-adjusting layers on the polarizers are parallel to each other.

18. The display device according to claim 13, wherein the liquid crystal light-adjusting layer at least comprises a first liquid crystal light-adjusting layer and a second liquid crystal light-adjusting layer, and in the first mode, there is an angle between orthographic projections of long axes of liquid crystal molecules in the first liquid crystal light-adjusting layer on the polarizers and orthographic projections of long axes of liquid crystal molecules in the second liquid crystal light-adjusting layer on the polarizers.

19. An anti-peeping film, comprising:

at least two polarizers; and a liquid crystal light-adjusting layer disposed between two adjacent polarizers;

wherein optical axis directions of the at least two polarizers are parallel to each other, and in a first mode, an angle between long axes of liquid crystal molecules in the liquid crystal light-adjusting layer and planes in which the polarizers are located is an acute angle, and the liquid crystal light-adjusting layers at least comprise a first liquid crystal light-adjusting layer and a second liquid crystal light-adjusting layer, and in the first mode, there is an angle between orthographic projections of long axes of liquid crystal molecules in the first liquid crystal light-adjusting layer on the polarizers and orthographic projections of long axes of liquid crystal molecules in the second liquid crystal light-adjusting layer on the polarizers.

20. The anti-peeping film according to claim 19, wherein in the first mode, the orthographic projections of the long axes of the liquid crystal molecules in the first liquid crystal light-adjusting layer on the polarizers is perpendicular to the orthographic projections of the long axes of the liquid crystal molecules in the second liquid crystal light-adjusting layer on the polarizers.

* * * * *